United States Patent [19]

Kanaljuk et al.

[11] Patent Number: 4,880,944

[45] Date of Patent: Nov. 14, 1989

[54] BAR FOR INDUCTION DEVICES

[75] Inventors: Viktor L. Kanaljuk; Anatoly M. Surakov; Vasily M. Chornogotsky; Lazar N. Shifrin, all of Zaporozhie, U.S.S.R.

[73] Assignee: Nauchno-Issledovatelsky, Proektno-Konstruktorsky I Tekhnologichesky Institut Transformatorostroeniya, Zaporozhie, U.S.S.R.

[21] Appl. No.: 151,822

[22] Filed: Feb. 3, 1988

[51] Int. Cl.[4] ..................... H01B 17/56; H01F 27/08; B32B 1/08

[52] U.S. Cl. ................................ 174/138 E; 138/115; 138/156; 138/178; 138/DIG. 11; 156/203; 156/218; 206/491; 206/814; 229/93; 229/112; 336/60; 428/34.2; 428/36.9; 493/295; 493/968

[58] Field of Search ........... 174/68 C, 97, 136, 138 E, 174/167; 310/65, 215; 336/60, 207; 138/115, 116, 117, 156, DIG. 11, 170, 177, 178; 156/203, 218, 226, 227; 206/491, 822, 521, 816; 229/93, 111, 112, 115, 113, 114; 493/295, 949, 968; 428/36, 128, 129, 34.2, 36.9, 36.91, 36.92; 52/731; 220/416; 108/51.3

[56] References Cited

U.S. PATENT DOCUMENTS

| | | | |
|---|---|---|---|
| 1,549,525 | 8/1925 | Cooney | 336/60 |
| 1,720,016 | 7/1929 | Tinsley | 229/112 X |
| 2,101,303 | 12/1937 | Williamson | 229/112 X |
| 2,368,505 | 1/1945 | Weldon | 174/138 E |
| 2,609,136 | 9/1952 | Sider | 108/51.3 X |
| 2,716,532 | 8/1955 | Wysong, Jr. et al. | 108/51.3 X |
| 2,986,716 | 5/1961 | Carlon | 336/207 X |
| 3,683,822 | 8/1972 | Roberts et al. | 108/51.3 |

FOREIGN PATENT DOCUMENTS

| | | | |
|---|---|---|---|
| 741910 | 11/1943 | Fed. Rep. of Germany | 310/215 |
| 1141838 | 3/1957 | France | 310/215 |
| 1485609 | 5/1967 | France | 229/93 |
| 69276 | 5/1945 | Norway | 138/156 |
| 2109639 | 6/1983 | United Kingdom | 336/192 |

*Primary Examiner*—Laramie E. Askin

*Attorney, Agent, or Firm*—Burgess, Ryan & Wayne

[57] ABSTRACT

A bar for electric induction devices is in the form of a lengthwise rolled-up strip of an insulating material, having at least one layer, the figure obtained in the cross-section of this rolled-up strip being a polygon.

2 Claims, 4 Drawing Sheets

BAR FOR INDUCTION DEVICES

FIELD OF THE INVENTION

The invention relates to electrical engineering, and more particularly relates to bars used as spacers or supports in various electric induction devices and installations.

BACKGROUND OF THE INVENTION

A bar of the type being described is used as an insulation component in the structure of the oil-barrier insulation of electric induction devices or inductances. The structure of the oil-barrier insulation includes either insulation cylinders or insulation sheets made of an insulating sheet material, called the barriers, which are spaced from one another by spacer bars of the type described. The reliability and quality of the oil-barrier insulation is heavily dependent on the regularity of the spaces between the barriers, and the regularity of these spaces is dependent on the accuracy of the dimensions of the spacer bars. The structures of the oil-barrier insulation generally fall within three types, namely, with planar arrangement of the barriers, with concentric arrangement of the barriers, and with barriers of arbitrary shapes. In most cases the oil-barrier insulation of an electric induction device is interposed between the low-voltage winding and the high-voltage winding, and also arranged about the high-voltage winding. As long as the low-voltage winding tends to contract under electrodynamic loads, while the high-voltage winding tends to expand, more often than not the oil-barrier insulation is not subjected to substantial mechanical loads. This lack of effect of high electrodynamic loads upon the structure of the oil-barrier insulation is explained by the fact that the windings of an electric induction device themselves are expected to be protected against the effect of the electrodynamic loads. This requirement according to which the windings should alter neither their shape nor their geometrical (overall) dimensions under the load is incorporated in the design of an electric induction device. Neither is the oil-barrier insulation arranged outside the high-voltage winding, on the oil tank wall and in other places subjected to excessive mechanical loads.

The spacer insulation bars of the oil-barrier insulation can be eventually loaded by way of their plane-parallel compression between the insulation cylinders brought about by the own weight of the oil-barrier insulation which is not considerable, or else by efforts applied to them at the assembly stage; these efforts, however, are not too difficult to either eliminate altogether or at least to alleviate.

An electric induction device, e.g. a power transformer or a reactor, has a number of current-conducting leads or taps usually in the form of either copper buses or cables. The leads or taps are fastened on the active part of an induction device with the aid of insulation bars. These bars, in addition to affording the required insulation, are also expected to have sufficient mechanical strength. The conventional practice is to make them of strips of hardwood, e.g. beech, or else of hard wood-plastic laminates, i.e. of materials offering adequate insulation and strength properties. Beech wood, however, is both a costly and hard-to-get material whose reproduction in nature is a lengthy process, whereas suitable plastic laminates are likewise costly.

An insulation bar for the oil-barrier insulation is generally made as a multilayer strip having its layers cemented to one another.

The manufacturing process of such bars is highly labor -consuming on account of its multioperational character. The operations involved are pattern-cutting a sheet of an insulating material, forming a multilayer strip, applying the adhesive onto the layers, drying in a compressed state, removing burrs and overflowing adhesive, stripping, etc. This manufacturing process is energy-consuming, too, requiring as it does for its implementation elevated temperatures and considerable pressures. A drawback of this technology is also the tendency of the bars being manufactured to get warped and delaminated during the drying and heat/vacuum treatment steps, which results in a considerable number of rejects.

A bar of the kind being described involves a heavy input of the insulating material, as its cross-section is solid, i.e. completely filled with the material.

More refined structurally and less material-consuming is an insulation bar made as a lengthwise rolled up strip having its longitudinal edges bent towards each other.

A disadvantage of this structure, however, is its open cross-sectional outline, which, on the one hand, impairs its mechanical strength, and on the other hand may result in a varying thickness of the bar itself on account of eventual warping and shrinking of the insulating material. A varying thickness of an insulating bar is intolerable when the bar is used as a spacer between the barriers of the oil-barrier insulation, as it impairs the dielectric strength of the insulation, and, hence, adversely affects the performance and service reliability of the electric induction device, as a whole.

There is known an insulation bar for supporting electric conductors (the leads or taps) in an electric induction device (GB, A, No. 2109639). This support is a box-section beam made of insulating board. However, this bar also has an open cross-sectional outline, impairing its mechanical strength. The use of additional reinforcing devices for enhancing the mechanical strength of the bar is a labor-consuming operation.

SUMMARY OF THE INVENTION

It is the main object of the present invention to create an insulation bar for electric induction devices, having sufficient mechanical strength.

It is another object of the present invention to create a structure of a bar for induction devices, which should have a significantly reduced specific amount of the material of which it is made in its structure.

It is still another object of the present invention to substantially increase the factor of utilization of the insulating material used for making an insulating bar for electric induction devices.

It is a further object of the present invention to provide for the saving of costly materials used nowadays for making bars of the prior art of the kind described.

It is a still further object of the present invention to reduce the input of labor into the manufacture of an insulating bar for electric induction devices.

It is not the least important object of the present invention to provide a relatively simple and easy-to-manufacture structure of an insulating bar for electric induction devices.

These and other objects are attained in a bar for induction devices, made in the form of a longitudinally rolled up strip of an insulating material, the strip, in accordance with the present invention, including at least one layer, and the figure obtained in cross-section of the rolled up strip being a polygon.

This provides for substantially enhancing the mechanical strength of the bar, while at the same time reducing the specific amount of the material of which it is made in its structure.

It is expedient that the cross-section of the rolled up strip should be trapezoidal, and with the bar produced by rolling up the strip repeatedly, that each successive trapezoid of the cross-section should encompass the preceding trapezoid, with the smaller base of each encompassed trapezoid adjoining the greater base of the encompassing trapezoid, defining in this way a plurality of turns.

This structure of the bar additionally enhances its mechanical strength.

It is expedient that at least one layer of the strip should have a succession of notches cut therefrom.

This structure of the bar provides for substantially reducing the input of the material of which it is made into its manufacture.

It can be expedient for each notch to have the shape of a component of the notch, made of an electrically insulating material.

This would enable to significantly step up the factor of utilization of the insulating materials.

It can be also expedient in the rolling up of the strip to have the notches cut in the adjoining portions of the layer overlap, forming a through opening.

This would allow to fasten a bar used in oilbarrier insulation without the necessity of additionally making through holes for fastening means at spaced points lengthwise of the bar.

BRIEF DESCRIPTION OF THE DRAWINGS

The invention will be further described in connection with its embodiments in several structures of a bar for electric induction devices, with reference being made to the accompanying drawings, wherein.

EMBODIMENTS OF THE INVENTION

Figure 1:
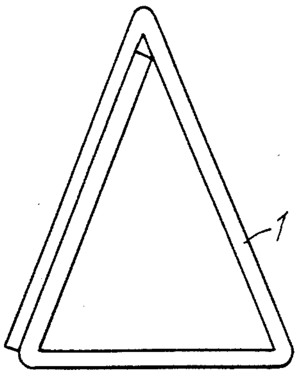
FIG. 1 is an elevational view of a bar for an induction device, embodying the invention and having at least one layer.
Figure 2:
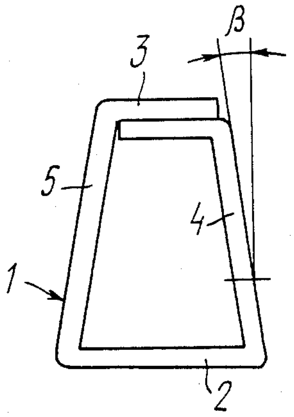
FIG. 2 and FIG. 3 are elevational views of bars embodying the invention, their cross-section being trapezoidal.
Figure 3:
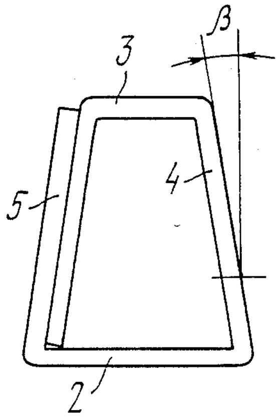

The disclosed insulation bar (FIG. 1) for an electric induction device or inductance, e.g. a transformer, is formed by rolling up longitudinally a strip of an insulating material. The strip has at least one layer or ply 1, and generally it is rolled up to a polygonal cross-section. Thus, as a whole, the bar structurally is a polyhedron of the rolled up strip. The formation of flat faces by each layer of the rolled up strip enhances the mechanical strength of the bar, whereas the hollow structure of the bar substantially reduces the specific amount of the material of which it is made in its structure. Thus, in the simplest embodiment of the bar it is a polyhedron which in cross-section is the simplest polygon, i.e. a triangle, as shown in FIG. 1. This bar is sufficiently mechanically stable and shape-retaining, and involves the minimum input of the electric insulation material for maintaining the required dimensions of the insulation gap between the barriers of an oil-barrier insulation. It can be expedient to form a bar in which the cross-section of the longitudinally rolled up strip is a closed trapezoid (FIG. 2 and FIG. 3). Preferably, it is an isosceles trapezoid whose bases 2 and 3 are the respective load-supporting planes, and the lateral sides 4 and 5 extending at an angle $\beta$ to a perpendicular to the bases 2 and 3 serve as the rigidity ribs.

With the strip forming the bar rolled up longitudinally, its interior is a through-going longitudinal space defined by the abovesaid load-supporting planes 2 and 3 and the rigidity ribs 4 and 5.

A more refined structure of an insulation bar whose cross-section is trapezoidal (FIGS. 4 to 6) is a structure where, in the rolling up of the initial strip, each successive trapezoid encompasses the preceding trapezoid, with the smaller base 3 of each encompassed trapezoid adjoining the greater base of the encompassing trapezoid, in which way several successive turns are formed by the rolling up. This technical solution provides for stepping up the mechanical strength of the bar by multiplying the number of the lateral sides of the trapezoids built into the bar. Thus formed, the bar owing to its enhanced mechanical strength can serve for securing the current-conducting leads or taps of an electric induction device.

Figure 4:
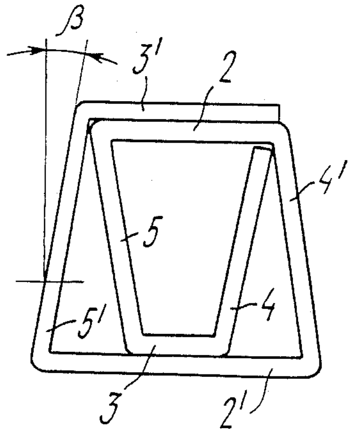
FIG. 4 and FIG. 5 are elevational views of bars for electric induction devices, embodying the invention, their respective strips being rolled up in several turns.
Figure 5:
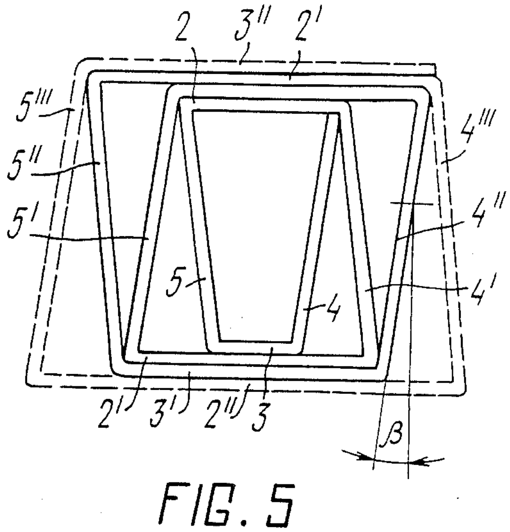
Figure 6:
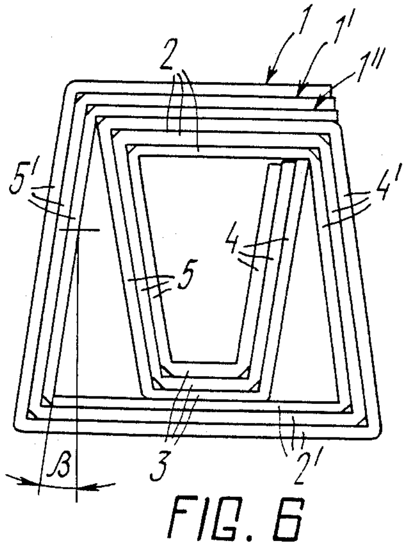
FIG. 6 is elevational view of a bar embodying the invention, rolled up of a multi-ply strip.

It can be also seen that an insulation bar embodying the invention can be of two turns, as shown in FIG. 4, or of more turns, as illustrated in FIG. 5, e.g. shaped as trapezoids in cross-section. These trapezoidal turns are received one within another, so that each smaller base 3 of each encompassed trapezoid adjoins the greater base 2′ of the next encompassing trapezoid, and the greater base 2 of the encompassed trapezoid adjoins the smaller base 3′ of the encompassing trapezoid, i.e. in the plurality of the trapezoids, as in FIGS. 4 and 5, the similar bases of successive trapezoids alternate. In this way the internal space of the bar is divided by the lateral sides 4 and 5 of the trapezoidal turns into a plurality of longitudinal channels. Alternatively, the strip of which a bar is formed by lengthwise rolling up can itself have several layers 1, 1′, 1″ . . . (FIG. 6).

It has been mentioned hereinabove that an insulation bar in an electric induction device has to withstand in service mechanical loads different nature and magnitude depending on its immediate use, e.g. as a spacer in the oil-barrier insulation, or as a support bar for securing current-conducting leads or taps. Thus, the quantity of the trapezoidal turns making up an insulation bar in accordance with the invention, same as the number of the plies or layers 1, 1', 1" . . . of the initial strip, have to be selected correspondingly in the manufacture of the bar.

Thus, a bar of a structure illustrated in FIG. 1 can be used as a spacer between insulation barriers, while a bar of the structure illustrated in FIG. 2 is suitable for forming partitions in the oil-barrier insulation A bar of the structure illustrated in FIG. 3 is suitable for interposing between the barriers (e.g. cylinders) of the main oil-barrier insulation of an electric induction device. Bars of the structures illustrated in FIGS. 4, 5 and 6 can be used for securing the current-conducting leads and taps of an induction device; moreover, it could be expedient in some cases to lay flexible conductors through the longitudinal channels of the bar to preclude their sagging.

Figure 7:
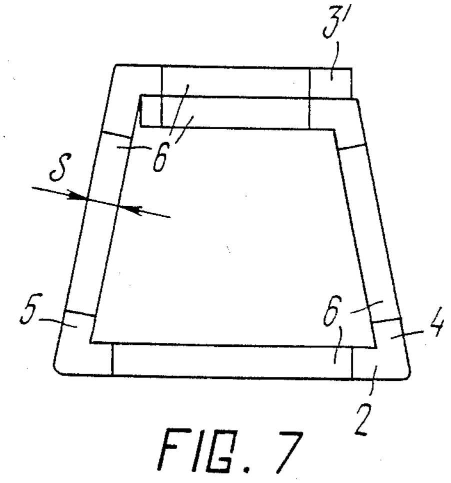
FIG. 7 is elevational view of an insulation bar embodying the invention, with successive notches cut out from its at least one layer.

An insulation bar in the form of a longitudinally rolled-up strip of an insulating material, defining in its cross-section a polygon, e.g. a trapezoid, retains its shape in parallel compression by the adjoining barriers of the oil-barrier insulation of an electric induction device. However, in random action of mechanical compression forces with localized areas of application, which could take place in the course of the assembly work on the oil-barrier insulation structure, it is desirable to provide for adequate rigidity of the insulation bar by increasing the thickness S of the initial strip (FIG. 7). This results in a greater input of the insulating material. However, this increased thickness is uncalled for in the bases 2, 2' . . . ,3, 3' of the trapezoids which carry no excessive mechanical loads.

Figure 8:
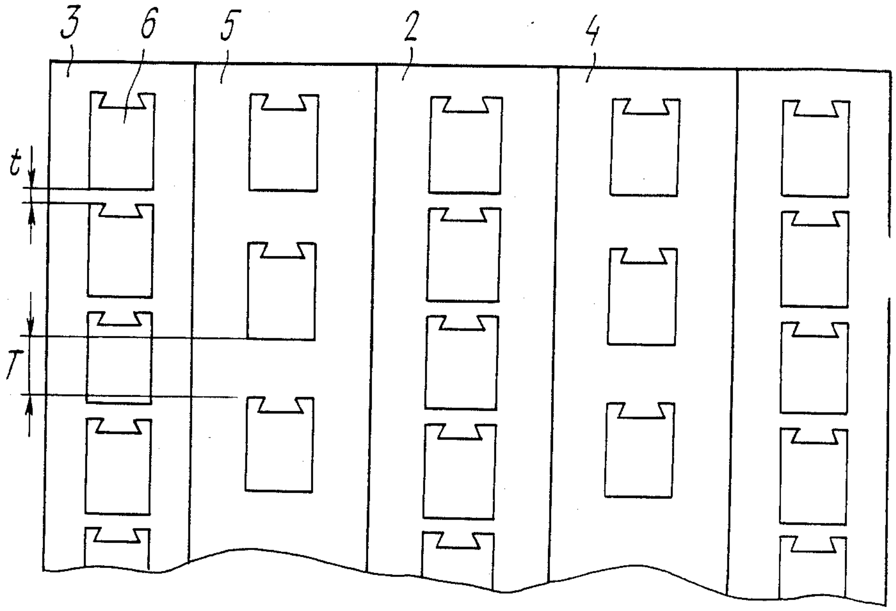
FIG. 8 is a developed view of the strip of the insulating bar illustrated in FIG. 7, in accordance with the invention.
Figure 9:
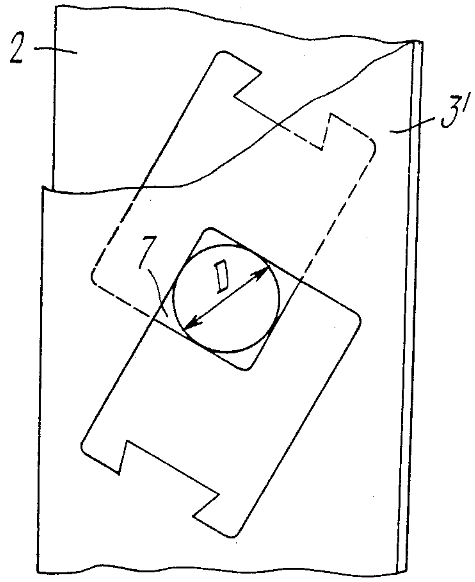
FIG. 9 is a view of an insulation bar wherein the notches of the adjoining layers in the rolling up of the strip overlap one another to form a through opening, in accordance with the invention.

The total weight of a bar can be reduced by cutting out from the initial strip successive notches 6 (FIGS. 7, 8). It could be expedient to have the structure of an insulation bar wherein, in the rolling up of the initial strip having several layers or plies 1, 1', 1" . . . , or else in the rolling up into several turns, of the initial strip having a single layer 1, the notches 6 of either the adjacent plural layers or of the adjoining portions of the single layer rolled up into several turns (the adjoining faces of a polygon or polygons) overlap one another, defining a through opening 7 (shown in more detail in FIG. 9). This through opening 7 could be used for setting the required fastening means, e.g. threaded insulation pins, bolts and the like.

By increasing the number of the notches 6, particularly in the portions of a bar not subjected to excessive mechanical loads—and the bases 2 and 3 of a trapezoid are such portions—the input of the material of the strip, and hence the weight of the bar can be substantially reduced.

The notches 6 in the bases 2, 2' . . . , 3,3' of the trapezoids can be situated at a closer spacing "t" than the spacing T of the notches 6 cut in the lateral sides 4, 4' . . . , 5,5'. To have a structure of a matching strength in different directions, the ratio of these spacings t and T can be expressed as:

$$t = T \cdot \sin\beta,$$

where t is the spacing of the notches 6 in the bases 2, 2' . . . , 3, 3' . . . of the trapezoids;

T is the spacing of the notches 6 in the lateral sides 4,4' . . . , 5, 5' of the trazoids;

$\beta$ is the angle of inclination of the lateral side (cf. FIG. 2).

Figure 10:
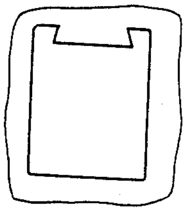
FIGS. 10, 11, 12, 13 and 14 show different examples of the shapes of the notches or cutouts, corresponding to the shapes of individual components of an electric induction device, in accordance with the invention.
Figure 11:
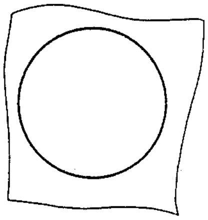
Figure 12:
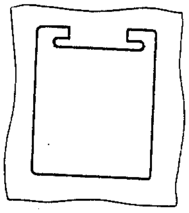
Figure 13:
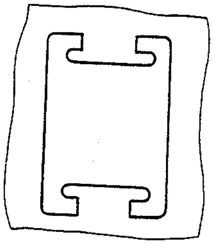
Figure 14:
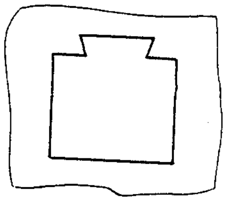

The manufacture of insulation bars having structures including successive notches 6 can be made more efficient when these notches 6 are shaped as some mass-produced insulation components obtained by their cutting out, e.g. insulating washers for fasteners (FIG. 11), spacers for winding of induction devices (FIGS. 10, 12, 13), parts of the cooling channels in windings (FIG. 14), and so on.

The invention provides for enhancing the mechanical strength of an insulation bar, for simplifying its manufacture and for reducing the input of the insulating material, as well as for replacing adhesive-bound insulation bars widely used nowadays in the manufacture of induction devices, e.g. transformers. Insulation bars embodying the invention offer an enhanced mechanical strength, e.g. of the structures illustrated in FIGS. 4 to 6, can replace beech bars currently used for fastening the current conductors of the active part of induction devices, thus providing for saving the cost of expensive materials.

INDUSTRIAL APPLICABILITY

An insulation bar in accordance with the invention was manufactured in a considerable number of specimens and tested in a pilot model of a transformer, in its large-scale working model and in a number of serially manufactured transformers. The positive results of the testing of the transformer and its model put through a comprehensive testing program proved sufficient service reliability of the structure of the insulation bar, as in the course of this testing the bars were subjected to the highest electrical and mechanical loads associated with the manufacture and service of presently produced transformers.

The preferred field of application of insulation bars in accordance with the invention is high-power transformers and reactors where they can be used as insulation spacers, and also transformers of all classes and power ratings where they can be employed as bars in fastening structures, e.g. for securing current-conducting taps and leads made of copper bars or cables.

What is claimed is:

1. An insulation bar for electric induction devices, formed as a rolled up strip of an insulating material having at least one layer, the cross-section of said rolled up strip being a polygon, said cross-section of said rolled up strip being substantially a trapezoid having a smaller base and a greater base, and with said strip being repeatedly rolled up, each successive trapezoid in said cross-section encompasses the preceding trapezoid, said smaller base of each said encompassed trapezoid adjoining said greater base of said encompassing trapezoid, in which way a plurality of turns are defined.

2. An insulation bar for oil barrier insulation of induction devices, formed from a strip of electric insulating material rolled up into a hollow trapezoidal prism, an inner longitudinal edge of said strip abutting an inner corner of the hollow trapezoidal prism formed by sides thereof, with the strip being rolled up repeatedly, said hollow trapezoidal prism is encompassed by a successive hollow trapezoidal prism which adjoins the encompassed hollow trapezoidal prism along parallel sides, the smaller side of the encompassed trapezoidal prism adjoining the larger side of the encompassing trapezoidal prism.

* * * * *